UNITED STATES PATENT OFFICE.

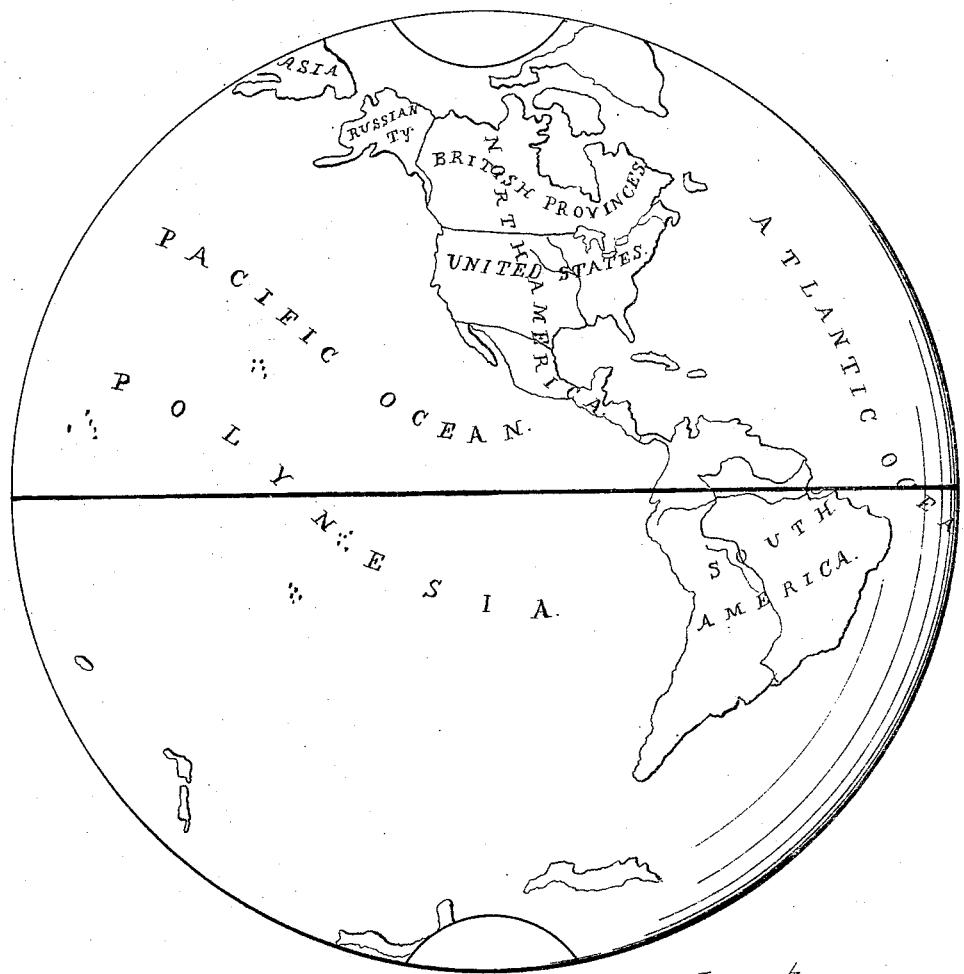

HENRY B. GOODYEAR, OF NEW HAVEN, CONNECTICUT.

METHOD OF RELIEVING GEOGRAPHICAL OUTLINES ON MOLDED ELASTIC GLOBES.

Specification of Letters Patent No. 31,311, dated February 5, 1861.

*To all whom it may concern:*

Be it known that I, HENRY B. GOODYEAR, of the city of New Haven, in the county of New Haven and State of Connecticut, have invented a new and useful Manufacture of India-Rubber Globes Constituting an Instructive Device; and I do hereby declare that the following, taken in connection with the accompanying drawing, which forms part of this specification, is such a full and clear description thereof as that others of competent skill will be enabled to make and use the same.

To combine amusement with instruction is one of the readiest modes of imparting knowledge to the youthful mind. It has been essayed in various ways or by different means, including dissecting maps and other contrivances which have been made the vehicles for impressing on the mind lessons connected with the fine or useful arts and science. Among the subjects on which knowledge has been sought to be thus imparted, none have appeared more appropriate and pleasing than geography and astronomy. Such celestial and terrestrial studies however, are especially to the very young extremely difficult to comprehend, and maps in illustration of the planetary system, or of the globe we live on with its sundry divisions of land and water, forming different countries and seas, fail in a most important particular to convey in a correct and impressive manner the facts or knowledge designed to be taught by them. Thus a child naturally infers that the earth he treads on is of a flat instead of a globular configuration and maps only serve to confirm this erroneous impression which it is the dictate of his senses to believe. To remove such defect and to convey a forcible impression of these truths as they are, and to accustom the eye, and through the eye of the mind to " form " in its reality as regards these matters " globes " have been used and are almost invariably held preferable to " maps." These globes have been made of various sizes and materials, hard and soft and of wood and paper. But in many or most or all of these, the parts or figures represented on their surface have merely been painted or printed and have failed to stand prominent from or on the general surface. Thus in a " globe " of the world, land has not stood out from water or, if in relief, has been an objectionable projection from and rises above the general surface, very liable to injury and objectionable in many other respects.

My present invention has for its object the production of that familiar and pleasing article—a ball, made of india rubber, guttapercha or their compounds which while it is devoid of the defects here alluded to in globes of various kinds, shall present on its surface, in relief, the objects or figures it is designed to illustrate, and so that not only is a child able to see and examine the several divisions and objects on its surface, clutching and feeling as well as seeing, and impressed, as he handles the ball, with the rotundity of our globe, but, whereby also, the poor blind child, may in a similar manner, and almost if not quite as readily learn by feeling and handling the object, the same truths.

The accompanying drawing represents a ball constructed according to my invention and in illustration of the earth with its various divisions of land and water, the figure in the drawing only necessarily showing one hemisphere.

To illustrate how this my invention is or may be carried into practice, I take for instance, a smooth ball of brass or other suitable material and of appropriate size, and scribe or delineate on it the outlines or boundaries of the places or objects designed to appear in relief on the rubber ball and which in the figure of the accompanying drawing may be the various lands or islands and continents of the earth. I then cut or reduce in beveling directions around the several outlines, so as to give an abrupt or indented edge to said outlines and gradually sloping or vanishing junction with the surrounding space or spaces which may represent the various waters or seas of the earth. The brass ball thus marked and cut is afterward employed as a core to cast a matrix on, which may be of type metal, and should be made in two pieces or halves or other suitable sections. I then take type of harder metal than the matrix, but of such configuration on its surface or so set and arranged in a suitable stick or holder as to conform to the interior concave shape of the two parts or halves of the matrix, and, by employing suitable letters in the use of said type, impress, by giving a suitable blow or pressure to the type stick or holder, or typesticks or holders in succession, the required lettering or printing necessary to form the names of the various lands and seas or otherwise make readable the several objects or divisions represented on the interior face of the divided matrix. The two parts of the matrix are then put together with a bag of india rubber, gutta percha or their compounds, deposited within them, and the rubber ball molded therefrom according to any of the wellknown modes or processes used for manufacturing hollow spherical bodies or other closed hollow articles of india rubber or its equivalent, or molded in any other suitable manner within and by the matrix marked and cut as described. In this way, it will be seen an elastic or rubber ball is or may be produced, which while it serves every purpose of the ordinary rubber ball, is in addition a round map or "globe" with its land or sea divisions or objects or figures appearing and standing in relief yet flush with the general surface and serving to maintain the rotundity of the globe which the ball represents. The ball thus made may of course be afterward painted and varnished as desired.

Having thus described my invention and the manner in which the same is or may be carried into effect, what I claim as my invention and desire to secure by Letters Patent is—

1. The method herein described of constructing an india rubber- or guttapercha- ball of the character specified, by first inscribing and indenting, as herein set forth, the several characters or divisions to represent a celestial or terrestrial globe, on a metallic or other suitable core, and afterward forming a matrix from the same wherein and whereby to mold the ball as described.

2. The method herein described of printing or lettering the interior of the matrix, used to form the ball, with type of convex configuration or set in conformity with the concave configuration of the matrix essentially as set forth.

3. The method of constructing a hollow india rubber or guttapercha ball with its exterior surface marked or divided to represent a terrestrial or celestial globe having its land or sea surfaces, objects or divisions, appearing and standing in relief, but flush with the general surface and whereby the rotundity of the ball is preserved, substantially as herein described and set forth.

In testimony whereof I have signed my name to this specification before two subscribing witnesses.

H. B. GOODYEAR.

Witnesses:
A. POLLAK,
HOMER B. SPRAGUE.